(12) United States Patent
Beardsley et al.

(10) Patent No.: US 10,577,100 B2
(45) Date of Patent: Mar. 3, 2020

(54) DRONE-BASED PAINTING SYSTEM

(71) Applicants: DISNEY ENTERPRISES, INC., Burbank, CA (US); ETH Zürich, Zürich (CH)

(72) Inventors: Paul A. Beardsley, Zurich (CH); Mina Samir Fekry Kamel, Zurich (CH); Nikola Stilinović, Bern (CH); Anurag Sai Vempati, Zurich (CH)

(73) Assignee: DISNEY ENTERPRISES, INC., Burbank, CA (US)

(*) Notice: Subject to any disclaimer, the term of this patent is extended or adjusted under 35 U.S.C. 154(b) by 234 days.

(21) Appl. No.: 15/798,601

(22) Filed: Oct. 31, 2017

(65) Prior Publication Data
US 2019/0127064 A1    May 2, 2019

(51) Int. Cl.
*B05B 9/04* (2006.01)
*B05B 13/02* (2006.01)
*B05B 13/04* (2006.01)
*B64C 39/02* (2006.01)
*G05D 1/08* (2006.01)
*G05D 1/00* (2006.01)

(52) U.S. Cl.
CPC .......... *B64C 39/024* (2013.01); *B05B 9/0426* (2013.01); *B05B 13/0278* (2013.01); *B05B 13/04* (2013.01); *G05D 1/0094* (2013.01); *G05D 1/085* (2013.01); *G05D 1/0866* (2013.01); *B64C 2201/12* (2013.01); *B64C 2201/141* (2013.01)

(58) Field of Classification Search
CPC ... B05B 13/0278; B05B 13/04; B05B 9/0426; B05B 12/1454; B05B 13/0431; B64C 2201/12; B64C 2201/141; B64C 2201/148; G05D 1/0094; G05D 1/085; G05D 1/0866
See application file for complete search history.

(56) References Cited

U.S. PATENT DOCUMENTS

| 4,864,966 | A | * | 9/1989 | Anderson | B05B 12/14 427/265 |
| 5,552,883 | A | | 9/1996 | Busch-Vishniac et al. | |
| 8,720,816 | B2 | * | 5/2014 | Salkeld | B64C 17/04 244/17.19 |
| 9,776,200 | B2 | * | 10/2017 | Busby | B05B 9/007 |
| 2010/0085185 | A1 | | 4/2010 | Nielsen et al. | |

(Continued)

*Primary Examiner* — Jerrah Edwards
(74) *Attorney, Agent, or Firm* — Snell & Wilmer LLP; Kent A. Lembke

(57) ABSTRACT

A painting system that makes use of drones such as modified quadrotors. The drone includes a support arm that carries a paint nozzle configured for pan and tilt motion. A power supply line is connected from an external power supply to the drone to allow extended flight time. A paint supply line is also connected from an external paint supply to the drone to allow extended painting time and/or surface coverage with each flight. The drone has an onboard controller so painting is autonomous with no human input being required. The drone stores a 3D model of the target structure annotated with the drone trajectory plus commands to control the pan-tilt paint nozzle to perform the painting. At runtime, the controller uses a sensor to view the target structure and localizes itself. The drone then traverses the stored trajectory and implements the painting commands to paint the 3D structure's surfaces.

17 Claims, 4 Drawing Sheets

(56) References Cited

U.S. PATENT DOCUMENTS

| | | | |
|---|---|---|---|
| 2011/0212254 A1 | 9/2011 | Morton | |
| 2011/0290937 A1* | 12/2011 | Salkeld | B64C 17/04 244/80 |
| 2013/0134254 A1* | 5/2013 | Moore | B64D 1/16 244/17.11 |
| 2013/0325217 A1 | 12/2013 | Seydoux | |
| 2014/0303814 A1 | 10/2014 | Burema | |
| 2015/0041598 A1 | 2/2015 | Nugent et al. | |
| 2016/0082460 A1* | 3/2016 | McMaster | B05B 9/007 701/2 |

\* cited by examiner

DRONE-BASED PAINTING SYSTEM

BACKGROUND

1. Field of the Description

The present invention relates, in general, to methods and devices for use in painting structures such as multicolor designs/textures (including signs with text), and, more particularly, to a painting system with a drone or unmanned aerial vehicle (UAV) (with these terms used interchangeably herein) that is adapted for unpiloted and automated painting of surfaces such as themed surfaces found in amusement parks and the like and surfaces that may have a multicolored design and/or texture and be three dimensional (3D) rather than merely planar surfaces.

2. Relevant Background

Painting remains a costly and time consuming maintenance task for owners and operators of many facilities as these facilities may include many large structures. Surfaces of many structures have to be periodically repainted as part of an ongoing and routine maintenance of the facilities. These surfaces may be quite large in size, may be irregular in configuration (e.g., not always be smooth and/or planar) and may be difficult to access such as due to their significant elevation, requiring scaffolding or a painter's cradle. As a result, painting can be relatively expensive due not only to costs associated with the paint used for the work but also due to labor costs and costs of equipment used to access these surfaces.

Painting, including painting of large structures such as scenery and ride components in amusement parks, generally remains a task performed using human labor (i.e., painters). One issue with such conventional painting is that it requires skilled labor and is expensive. Another problem with conventional painting methods is that some large structures, such as rockwork and other scenery at a theme park or architectural ornamentation of nearly any large facility, are difficult to access by the painters (e.g., rollercoaster scaffolds and rails). A further problem with conventional painting is that many structures have surfaces decorated with multicolor designs and/or textures that have to be repainted over time to maintain their appearance. However, the painters will not be the same with each repainting process such that it may be difficult to retain the original appearance with each painter diverging to some degree from the original painter of each surface.

Hence, there remains a need for new methods and tools for initial painting and later repainting of surfaces of large structures. Preferably, such painting methods and tools would be less expensive to purchase and easier and safer to use for painting larger structures with 3D surfaces, which may present human access challenges and which may be painted with a specific multicolored design and/or texture, than conventional painting with skilled labor.

SUMMARY

With regard to painting large structures and above-discussed problems, the inventors recognized that it would be desirable to replace human painting, and this could potentially be done through the use of a drone or UAV (such as a quadcopter or the like). For example, it is difficult for humans to access many large structures that may have irregular or 3D surfaces (rather than simple planar surfaces), but a drone can be controlled to fly nearly anywhere in space nearby the structure's surfaces. Also, the person performing repainting may change over time, but a drone can be controlled to perform an identical painting routine each time to provide a consistent appearance for painted surfaces.

Hence, in brief, a painting system was designed by the inventor that makes use of drones (or is drone-based). A commercial UAV such as a quadrotor or quadcopter may be used for the drone, but the drone is modified in several ways to be able to perform the painting functions and is also supported by several peripheral components during painting (i.e., other components of the painting system). Particularly, a drone is modified to include a support arm that carries toward or at its end a paint nozzle that is configured for both pan and tilt motion (a.k.a. "yaw and pitch motion"). A power supply line is connected from an external unit (power supply) to the drone to allow extended flight time. A paint supply line is also connected from an external unit (paint supply) to the drone to allow extended painting time and/or surface coverage with each flight. In other embodiments, though, the paint supply and power supply are provided onboard the drone.

The drone is configured with an onboard controller, made up of hardware and software, so that painting is autonomous with no human input being required during painting. The drone stores a pre-scanned 3D model of the target structure (e.g., a digital 3D representation of its external surfaces) to be painted in memory/data storage devices that can be accessed by the controller. The 3D model is annotated with the drone trajectory around the structure plus commands to control the pan-tilt paint nozzle to perform the painting when properly positioned relative to the 3D structure. At runtime, the drone's controller uses a sensor to view the target structure and, through processing of the sensor output, localizes itself (e.g., determines its 3D location). The drone then traverses the stored drone or painting trajectory retrieved from memory and implements the painting commands at appropriate points or 3D locations in this trajectory to paint the 3D structure's surfaces. The localization procedure, in some embodiments, also uses additional sensors such as GPS sensors.

More particularly, an autonomous painting system is provided for painting a target surface (e.g., a 3D surface with texture) of a structure. The system includes a drone including a drive system and a body supporting an onboard controller. The system further includes a support arm extending outward from an exterior surface of the body of the drone. A spray paint nozzle is mounted on the support arm, and a paint supply is positioned external to the body of the drone and is fluidically connected to the spray paint nozzle with a paint supply line. However, other embodiments utilize an onboard paint supply. During painting, the controller operates the drive system to position the spray paint nozzle relative to the target surface and operates the spray paint nozzle to spray paint supplied by the paint supply via the paint supply line onto the target surface.

In some embodiments, the drone takes the form of a multirotor helicopter (e.g., a quadrotor or the like), and the spray paint nozzle is positioned on the support arm at a distance from the exterior surface of the body of the drone to be outside a rotation diameter of rotors of the multirotor helicopter. In these and other embodiments, the painting system also includes an external power source (and no main/large battery in the body while other embodiments may include an onboard power source), and a power line is provided to connect a set of electrically powered components (such as the controller, sensors, the drive system, and so on) on the drone and the support arm (such as the nozzle actuator and pan-tilt motors) to the external power source. In the system, the external power source and the paint supply are positioned at an elevation greater than an elevation of the target surface of the structure, and a protective cage may be mounted over the propellers/rotors to avoid contact between supply lines and spinning propellers/rotors.

In some implementations, the system also includes a tilt motor and a pan motor on the support arm operable to impart tilt and pan motions, respectively, to the spray nozzle in response to control signals from the controller. In such implementations, the system also may include memory (or one or more data storage devices) on the body of the drone accessible by the controller, and the memory stores a 3D model of the target surface annotated with a trajectory for the drone to follow during painting of the target surface and with a set of paint commands associated defining operations of the spray paint nozzle at locations along the trajectory. In some cases, the control signals for the pan and tilt motors are generated by the controller to position the spray nozzle based on the trajectory. The system may also include a set of sensors (e.g., one or more sensors) on the body of the drone sensing information on the target surface (e.g., a camera and IR sensor providing information for visual odometry or the like). Then, the controller processes the sensed information along with the 3D model of the target surface to localize the drone and, in response, to generate the control signals for the pan and tilt motors and the control signals for the spray nozzle.

DETAILED DESCRIPTION

The following provides a description of an autonomous spray painting system, which is suitable for industrial applications, that uses a drone to perform the painting of surfaces of large structures that are difficult for a human painter to access. Going beyond the basic functionality of painting a single color on a planar surface, the painting system is designed to support the painting of multicolor designs/textures and the painting of surfaces of a 3D (or nonplanar) structure. In general, nearly any type of painting may be performed by the painting system including multicolor designs/textures, which is meant to include painted signs with text as well as textures like themed rockwork, scenery, and the like.

The drone may be implemented as a multirotor helicopter such as a quadcopter that may be labeled or thought of as a paintcopter. It can be based on a commercially available drone that is modified to include a support arm and a pan-tilt paint nozzle attached to an end of the support arm to position the nozzle away from the body of the drone and out from underneath the rotors whose spinning would likely disrupt spray painting of surfaces near the drone. The power source for the drone may be onboard, but, to support additional deployment time for industrial painting tasks, an external (or offboard) power source (or supply) is included in the painting system and is used to deliver power to the pan and tilt motors of the nozzle (as well as the nozzle open/shut actuator) via a power supply line and an external (or offboard) compressor (paint (and air in some cases) supply) is used to deliver paint to the pan-tilt paint nozzle. In brief, system operation includes: (a) a component to capture a 3D model of the target surface; (b) an offline component to annotate the stored 3D model with a drone trajectory for use in painting surfaces of the target surface along with a set of painting or nozzle commands; and (c) a live system that, during flight, localizes the drone against the target surfaces using the annotated 3D model and that carries out painting by implementing the drone trajectory and spray-nozzle commands.

With regard to motivation for creation of the new painting system, robotic painting using a drone has the potential to be cheaper and faster than manual painting, especially where it replaces the need for scaffolding and ladders. The design parameters or goals for the painting system may include the painting of texture as well as flat or a single color and painting on 3D as well as 2D surfaces. Painting of texture and painting on 3D surfaces is much more challenging and motivated a number of the features of the painting system described herein.

Figure 1:
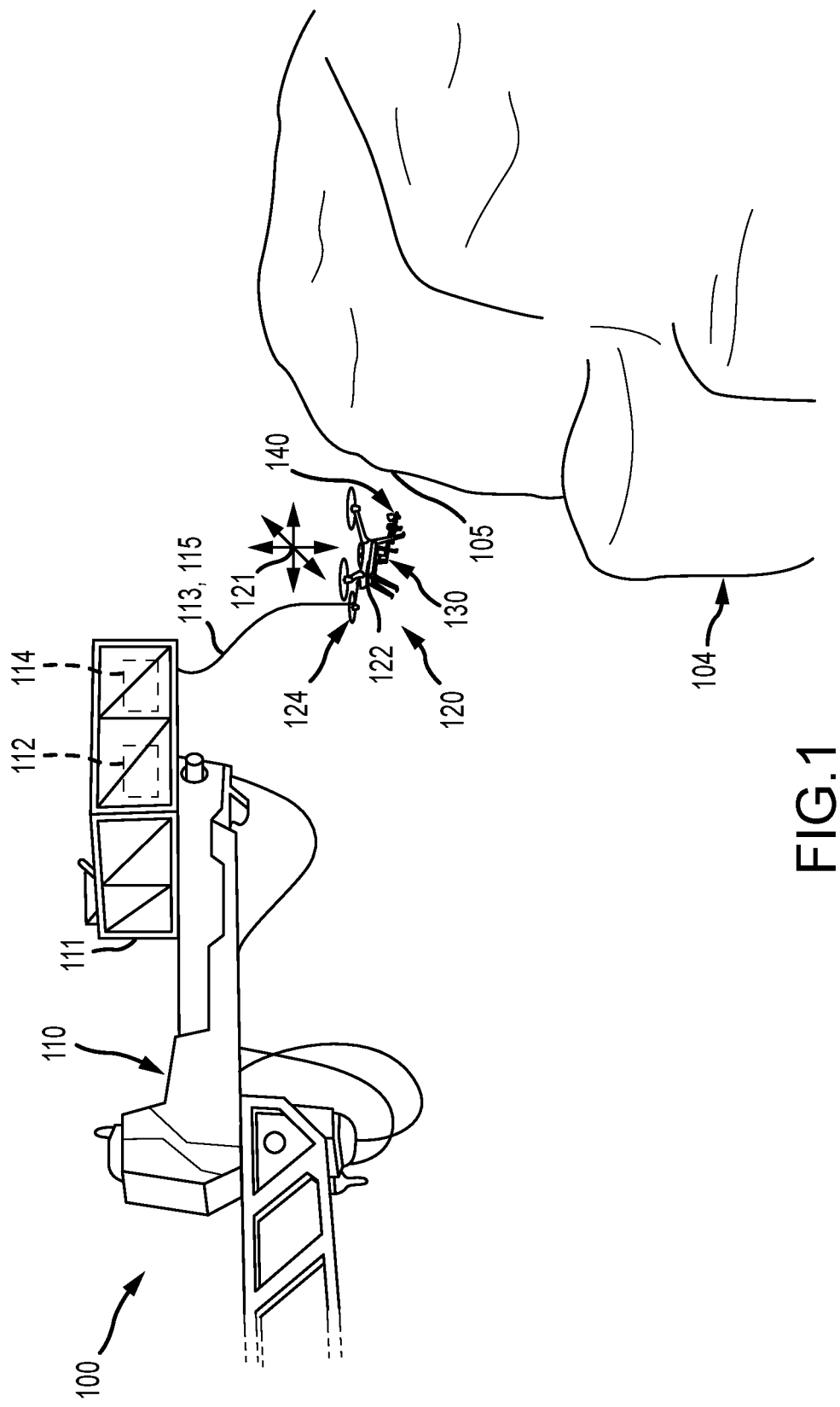
FIG. 1 is side perspective view of a painting system of the present description during its use in painting a large structure (e.g., a large rocky scenery or decorative structure)

FIG. 1 illustrates an exemplary painting system 100 of the present description during its use in painting a 3D surface 105 of a large structure 104 (e.g., a rocky scenery or decorative structure that may be painted with texture and that includes irregular 3D surfaces rather than only 2D or planar surfaces). The system 100 is shown to include a supply support assembly 110 in the form of, in this example, a cherry picker or crane with a cage/box 111 supported in midair above the target surface 105 of the structure 104. Within the cage/box 111, the system 100 includes a power source or supply 112 along with a paint (and air) supply 114 (e.g., with a liquid pump for paint and/or compressor for providing compressed air), and power and paint supply lines 113, 115 (and an separate air line in some cases) are fluidically coupled at a first end to supplies 112, 114 and a second end to a drone 120 (e.g., to a pan-tilt nozzle 140). In other embodiments, though, the paint supply is provided onboard.

The painting system 100 further includes the drone (e.g., a quadcopter or the like) 120 with a body 122 that is moved in any direction (as shown with arrows 121) via operation of rotors 124 by an onboard controller (not shown in FIG. 1) to follow a painting trajectory (stored in memory on body 122). The drone 120 is modified to include a support arm 130 that is affixed at one end to the body 122 of the drone 120, and the arm 130 is typically formed with one, two, or more rods, struts, or tubes of rigid but lightweight material (such as a plastic) and has a length that is chosen to position the arm's second, distal end a predefined distance from the body 122 to place it outside the diameter of rotation for the rotors 124 (e.g., outside a wash zone generated by movement of the rotors 124). At this distal, second end of the arm 130, a pan-tilt paint nozzle 140 is mounted, and the power and paint supply lines 113, 115 are fluidically coupled to the inlet of the nozzle 140 to enable spray painting during operation by an onboard controller of the nozzle 140 (by implementing paint commands annotated onto a 3D model of the structure 104). The system 100 is autonomous as no manual drone pilot is required.

Figure 2:
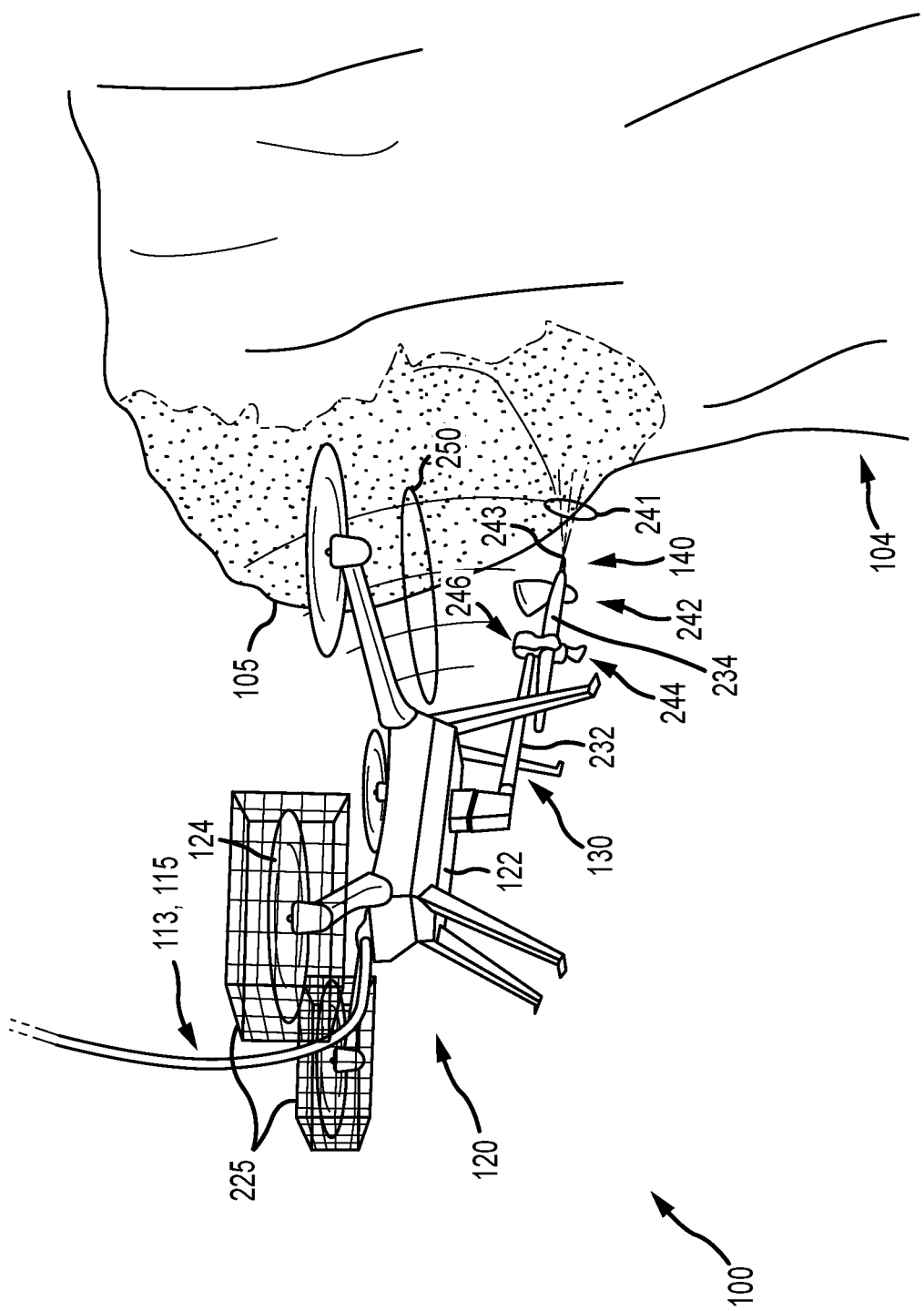
FIG. 2 illustrates the painting system of FIG. 1 in greater detail during painting of the structure.

FIG. 2 illustrates an enlarged view of the painting system 100 of FIG. 1 showing additional details of the modified paintcopter 120. To avoid contact between the lines 113, 115 and rotors 124, rotor enclosures 225 are shown covering at least two of the rotors 124 (e.g., the two rotors 124 between which the lines 113, 115 are run to enter the body 122). The rotor enclosures 225 typically will be formed of a lightweight screen or mesh, to limit air resistance and reduce weight such as one formed of plastic. The power supply line 113 may be a very thin and lightweight wire that may provide greater than 400 volts or the like, and this eliminates the need for a battery on the drone 120. Hanging the lines from above by positioning the supplies 112, 114 above the surfaces 105 to be painted with the drone 120 is desirable in many applications as it takes weight off the drone 120 (e.g., it avoids trailing weight of the lines 113, 115 if provided with lower elevation supplies). The controller of the paintcopter 120 is shown with waves/signals 250 to be operating its onboard sensor(s) to be sensing the 3D surface 105 of the structure 104, and this sensed information is processed to provide localization of the body 122 and, in turn, the nozzle 140 by comparing the sensed information to the 3D map of the target surface 105.

In this embodiment of the drone 120, the support arm 130 is shown to be a two-piece design with an inner arm 232 attached at one end to the body 122 and at a second end to an outer arm, which supports the nozzle 140 with its outlet 243. To disperse or spray paint 241 onto the surface 105, the nozzle 140 includes an actuator 242 that can be operated by the controller to open and close based on a set of paint commands mapped to the 3D model of the structure 104. The nozzle or nozzle assembly 140 further includes a tilt motor 244 for tilting the outer support arm 234 and nozzle outlet 243 relative to the rigid inner arm 232. Additionally, a pan motor 246 is provided at the end of the inner support arm 232 to rotate or spin the outer support arm 234 and nozzle outlet 243 relative to the fixed outer or second end of the inner support arm 232. The operation of the tilt and pan motors 244, 246 based on the painting commands by the controller provides the fine localization control over the painting 241 of surface 105 while operation of the rotors 124 in response to sensed 250 surface information provides gross localization control (or gross 3D positioning of the paintcopter 120 and nozzle 140).

Figure 3:
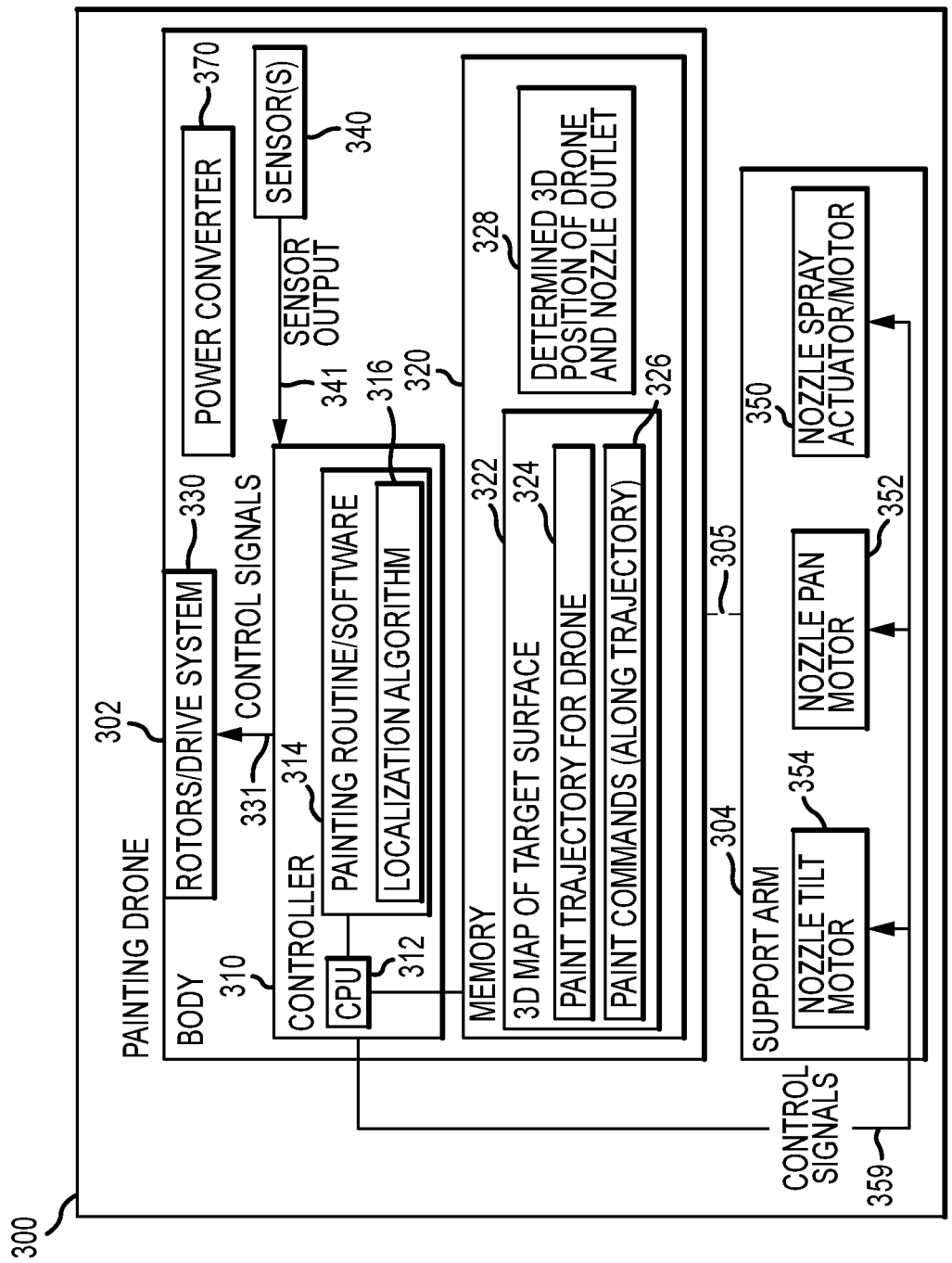
FIG. 3 is a schematic or block diagram of a painting drone useful in the painting systems of the present description (such as the systems of FIGS. 1 and 2)

FIG. 3 illustrates a block diagram showing schematically the hardware and software components of an exemplary painting drone or UAV 300. As shown, the drone 300 includes a body 302 with a drive system (with multiple rotors in most cases) 330 that is operated to selectively position or fly the body 302 in space (e.g., in 3D positions or locations set by a painting trajectory 324). The body 302 is shown to include a power converter 370 for converting (e.g., AC-to-DC or DC-to-DC conversion) power from a power source that is located offboard and is connected to the converter 370 via a power supply line (not shown in FIG. 3 but seen in FIGS. 1 and 2) for use by onboard components such as the rotors/drive system 330, the motors 350, 352, 354 on the support arm (or elements of a nozzle assembly), the processor 312, and the sensor(s) 340. In this manner, when a commercial drone is used as the base for the painting drone 300, it can be modified to remove the battery to limit its weight and/or provide space for added components including the sensor 340 and controller 310. It may be desirable to have the center of mass of the drone 300 remain near the center of the body 302, and the position of the converter 370 and controller 310 may be chosen to offset weight added with the support arm 304 and other drone components.

The painting drone 300 is further shown to include the onboard controller 310, which is configured to make the drone 300 autonomous (not require a human pilot for positioning or for painting operations). To this end, the controller 310 includes a processor 312 that operates to manage access to and from memory/data storage 320 on the body 302 and to execute code/software including the painting routine/software 314 to provide the functionality described herein. These functions include generating and transmitting control signals 331 to the rotors/drive system 331 to fly and position the drone 300 as well as generating and transmitting control signals 359 to the nozzle spray actuator/motor 350, the nozzle pan motor 352, and the nozzle tilt motor 354. The control signals 331 and/or 359 may be transmitted wirelessly in some cases, but, more typically, the controller 310 is wired to each of these devices (including sensor(s) 340) to avoid or limit the use of wireless communications in a drone-based painting system. Note, in this regard, the use of an onboard controller 310 running a painting routine/program 314 is useful to avoid wireless communications with a base station/control system that can be problematic (e.g., can involve undesirable delays, missed signals, and the like).

Prior to painting operations, a 3D map or model of the target surface 320 to be painted is scanned/generated and stored in memory 320 on the drone 300. The 3D model 320 is annotated with the paint trajectory (or flight path) for the drone 300 so as to position it through a plurality of 3D positions along or relative to the targeted surface defined in the 3D model 320. Further, a set of paint commands 326 are used to annotate the 3D model 322 so as to define where paint is to be applied along the trajectory 324 and, in some cases, what colors and/or texturing (painting techniques) are to be used. A sensor(s) 340 is provided that is operated by the controller 310 to generate sensor output 341 that provides information regarding a targeted surface of a structure (e.g., shows what the sensor such as a camera "sees" nearby the flying drone 300), and, in some embodiments, sensor(s) 340 may include one or more GPS components to provide a "gross" position 341 of the drone 302 while a camera or other sensors are used to provide fine tuning of the localization.

The sensor output 341 is processed by a localization algorithm 315 run by or accessed by the painting routine/software 314 to determine a 3D position of the drone and/or paint nozzle outlet as shown being stored in memory 320 at 328. This 3D position 328 is used by the painting routine/software 314 to issue control signals 330 to the drive system 330 to follow the paint trajectory 324 and also to implement the paint commands 326 to operate the nozzle spray actuator/motor 350 with control signals 359. This position 328 is also used by the painting routine/software 314 to generate control signals 359 to the nozzle pan motor 352 (for left and right movements) and nozzle tilt motor 354 (for up and down movements) to provide a higher frequency and finer level of control of the output of the spray nozzle than can be provided with control signals 331 to the drive system 330 (e.g., to make smaller position adjustments than possible with the rotors and/or to in real time correct for small movements of the drone body 302 (such as due to wind or the like)). As shown at 305, the motors 350, 352, 354 are supported on or in a support arm 304 that is attached to the body. The support arm 304 is adapted to position the outlet of the nozzle a predefined distance away from the body 302 so as to not be directly below the spinning rotors (or, in some cases, outside the rotor wash).

The drone 300 is autonomous in that it can sense the environment about its body 302 with sensors 340 as it flies (or makes a painting run), and its controller 314 with localization algorithm 316 can process the sensor output 341 to determine the 3D position to provide localization. The localization (or 3D position) is used to implement the paint trajectory 324 as well as to provide live painting or depositing via the paint commands using the 3D map/model 324 of the surfaces of the targeted structure. A camera may be used for sensor(s) 340 to provide visual sensing 341 of the environment including both color and depth of the 3D surface being painted while infrared (IR) projection may be used also or instead to provide the information useful in generating the 3D position of the drone and its carried paint nozzle (e.g., determine the position of the nozzle outlet down to about 2 centimeters using a combination of the prescanned 3D map/model 322 and the sensor output 341 rather than within about 2 meters when rely solely on GPS-based techniques).

With regard to hardware used to implement a drone-based painting system, the paintcopter (e.g., that shown in FIGS. 1-4) may be implemented using a commercially-available drone (e.g., a DJI Matrice drone or the like) that is customized with an arm plus a pan-tilt spray nozzle. The sensor unit may also be implemented using commercially-available sensors such as a DUO MLX stereo camera-IMU or the like that may be supplemented with an Intel RealSense RGB-D sensor or the like. Flight time using an onboard battery can be too time limited for industrial painting tasks, and the drone's battery was replaced by a power supply line connected to an external power source. Similarly, painting using an onboard paint reservoir can be too limited in terms of surface area than can be painted on each flight, and the painting system is designed to supply paint via a line from an external compressor (paint supply) to the paint nozzle. The power and paint supply lines arrive from a point above the drone (supplies/sources positioned at a greater elevation than the target surface on the structure), and a mesh cage may be provided on the drone to prevent contact with the propellers/rotors.

Regarding system operations, firstly, a 3D model is captured for the target surfaces that are to be painted. Secondly, a designer specifies the desired surface appearance using the 3D model (in an offline process). The designer specification is used to generate (automatically in some embodiments) the drone trajectory plus the pan-tilt spray nozzle control commands to produce that appearance. Thirdly, in the live system, the drone localizes relative to the physical surface using the 3D model, and painting is done using the stored drone trajectory and spray nozzle commands.

With regard to painting texture, one design goal for some embodiments of the painting system is to paint texture including varying color, gradients, and lines as opposed to flat color. An example would be to paint a homogenous surface so that it looks like brickwork. Painted texture is not common because it requires skilled work approaching artistry. However, a robotic approach such as that brought by the drone-based painting system opens up the potential for painted texture. Different colors on the surface are achieved by sequential spraying of different densities of different color paint. In order to transition between colors, the drone may dock to allow the paint line to be manually exchanged. Prototyping and testing has demonstrated use of a drone from 3D capture of target surface through generation of drone trajectory and spray nozzle commands and through painting on a 3D textured object.

Figure 4:
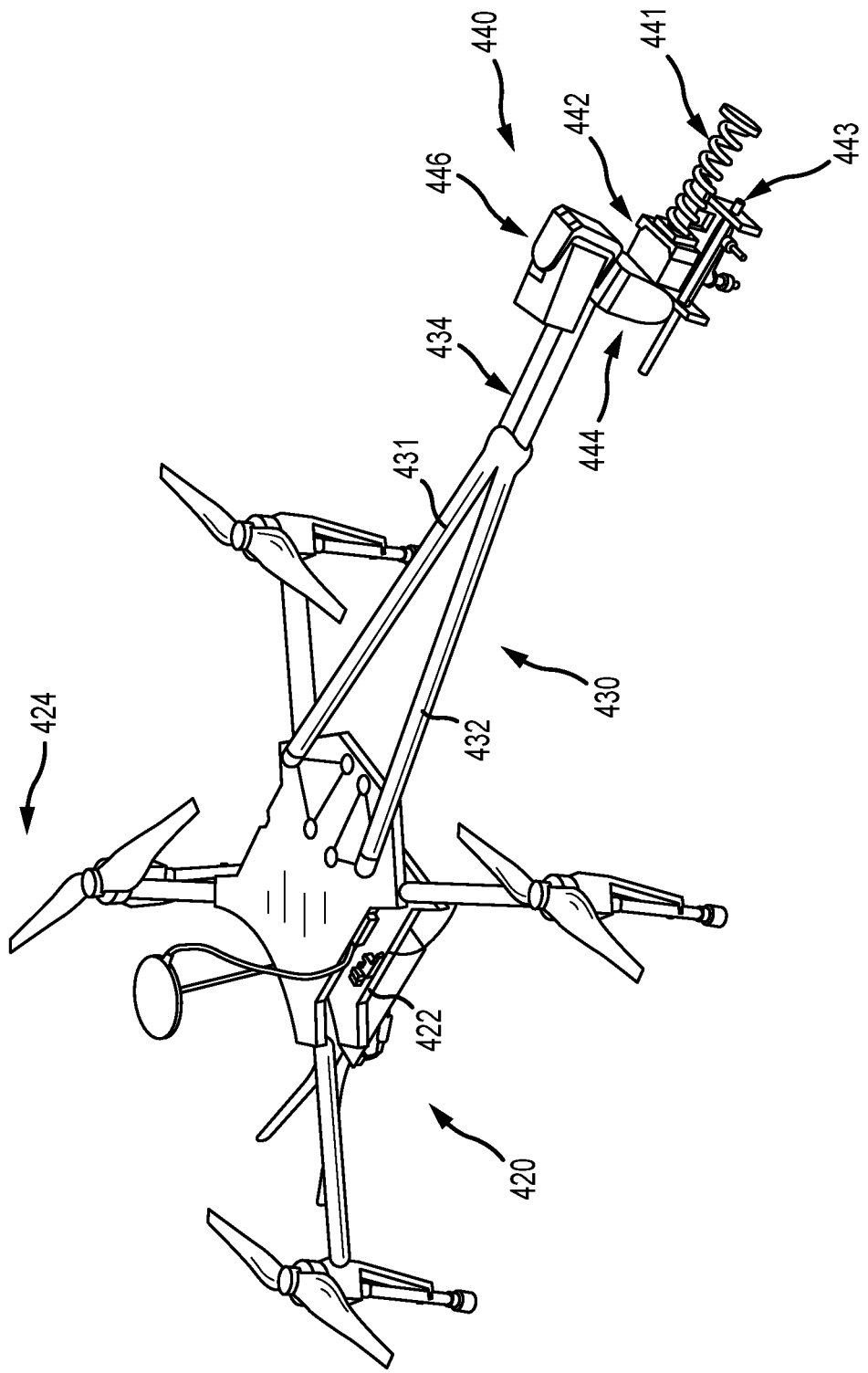
FIG. 4 is a top perspective of another embodiment of a drone or paintcopter for use in a painting system of the present description.

FIG. 4 is a top perspective view of another embodiment of a paintcopter or drone 420 that may be used in a painting system of the present description (such as system 100 in FIGS. 1 and 2). As shown, the drone 420 includes a body 422 that is used to house the sensors, the controller, and the memory as well as any power converters used to deliver power from an external source/supply to the onboard devices and the motors/actuators of the nozzle assembly 440. A set of propellers or rotors 424 are used to fly the drone 420 about a space proximate to a structure with a 3D surface targeted for painting.

The support arm 430 in this embodiment is shown to include left and right (or first and second) inner arms 431, 432 that are in the form of rigid tubes/cylinders through which a power supply line and a paint supply line (and, in some cases, a compressed air line) are run, respectively. The two arms 431, 432 are fixed at a first end to the body 422 and extend outward (e.g., generally horizontally relative to the body 422 in a plane parallel to a plane in which the rotors 424 rotate) a distance beyond the outermost diameter of the nearby rotor pair. The support arm 430 includes an outer arm 434 after which the inner arms 431, 432 have been coupled and/or positioned proximate to each other or in contact with each other as shown.

A nozzle assembly 440 is mounted at the outermost end of the outer arm 434. The nozzle assembly 440 is shown to include a nozzle/nozzle outlet 443 through which paint is sprayed during painting operations with the drone 420, and a motor/actuator 442 is provided for selectively opening and closing an upstream valve(s) (e.g., in response to control signals from the controller in body 422) to spray the paint (and compressed air if separately supplied) from the nozzle/nozzle outlet 443. A protective element 441 that may take the form of a spring is provided adjacent the nozzle 443, and the protective element 441 extends parallel to the nozzle 443 but a distance greater than the nozzle 443 from the end of the arm 434 so that the nozzle 443 is protected from inadvertent collisions with 3D surfaces being painted (which will first collide with the outer end of the spring or other protective element 441).

The nozzle assembly 440 provides both pan (or yaw) and tilt (or pitch) motion for the nozzle 441. To this end, the nozzle assembly 440 includes a tilt motor 444 for tilting the nozzle 441 up and down relative to containing the support arm 430 (e.g., relative to "horizontal"). Further, to this end, the nozzle assembly 440 includes a pan motor 446 for rotating the nozzle 441 about an axis that is orthogonal to the arm 430 (and may extend through the end of the outer arm 434). Both of these motors 444, 446 are operated in response to control signals from the controller to provide high frequency and finer tuning of the location of the nozzle 443 relative to a 3D surface to better implement paint commands associated with a paint trajectory that is annotated to a map or 3D model of the structure with the targeted surface.

The paintcopter 420 as shown in FIG. 4 may be implemented with the following system components: (a) a DJI Matrice 100 drone with a custom arm supporting a pan-tilt nozzle; (b) a Jetson TX2 with Astro carrier board for sensing and spray nozzle control; (c) an Intel UP board for flight controller communication and position control; (d) a sensor unit; (e) an offboard power source and power line; (f) an offboard paint supply/unit and paint line; and (g) an upper cage to prevent the paint and power line from contacting the rotating rotors.

In one prototype, the drone 420 was based upon a DJI Matrice 100 drone that is augmented with a custom arm and pan-tilt spray nozzle. The support arm may include three carbon fiber tubes in a triangular configuration, with 3D printed aluminum mounting plates and a total weight of about 140 grams. The pan-tilt nozzle has two servo motors to allow yaw movement (e.g., a range of plus/minus 90 degrees) and pitch movement (e.g., a range of plus/minus 45 degrees) of the nozzle. A further servo actuates the nozzle spray, with a controllable aperture between closed and open. A compliant spring is placed at the end of the arm and nozzle to prevent damage of the nozzle in case of unwanted contact with the painting surface (e.g., due to wind or the like). The onboard electronics have been shifted as far as possible to the opposite side of the drone from the arm so that center-of-mass remains close (e.g., within about 40 mm) to the center axis of the platform. The total weight of the modified drone was about 3800 grams.

In the prototype drone, the sensor unit included a DUO MX stereo camera+IMU and an Intel RealSense R200. They were calibrated against each other. The DUO MLX was used for visual odometry, while the RealSense offered two modalities for capturing depth. Note, the RealSense was range limited but was valuable when the drone was close to the target surface. The offboard power was realized using a ground or offboard supply (1000 W 220AC/400DC step up converter) and onboard unit (2400 W 400DC/24DC step down converter). The drone battery was replaced by a custom high voltage DC/DC converter, along with a modification to the communication protocol so that the drone had unlimited flying time on a power line. The advantage of a high voltage tether between the offboard unit and the platform/body was that it allowed thin wires (22-24 AWG).

The offboard paint supply, in the prototype, took the form of an air compressor operating at 1-3 bar and a paint reservoir. A paint line was dedicated to a single color of paint, and swapping between paint lines was designed to be convenient and spill-free. A mesh cage was included on the prototyped drone to prevent the power and paint lines from coming into contact with the propellers of the drone, when the lines are positioned above the drone's flight position. The mesh cage was constructed from 2.5 mm thick carbon fiber tubes connected with 3D printed plastic parts to form a frame, which was covered with a mesh of nylon cord. Power and paint lines arrived from above the drone. Having the external lines above or below the drone is an application-dependent choice. For lines that come from below, drag limits the maximum height of the drone. For lines that come from above, drag is avoided but the external power and paint units must be positioned above the painting surface, e.g., on a roof of a building, on a cherry picker, or the like. For lines positioned above, there may also be a need for an automatic cable winder to keep the lines relatively taut.

To provide a 3D model/map, the target surface can be scanned (such as with software/procedures defined by commercial products such as Infinitam, Vempati IROS) with the drone under manual control. The scan generates a Truncated Signed Distance Field (TSDF), which is stored on disk/memory with its associated hash table as the 3D model for the target surface. The 3D model is subsequently used in the following two ways: (1) as a basis for designing the appearance of the target surface and (2) to provide the underlying scene representation and coordinate frame to which task planning commands like drone trajectory and spray-nozzle control are attached. The 3D model and task planning commands are used to guide the live system.

In the live system, the drone localizes against the physical surface using the stored 3D model and then implements the drone trajectory and spray nozzle (or paint) commands. Firstly, coarse localization of the drone relative to the target surface is carried out. Secondly, more accurate localization is then carried out using the onboard sensor output (e.g., sensors such as cameras providing visual odometry). The processing may be performed on a reserve memory (much smaller size) until a patch of the scene is mapped. This mapped scene is published as a ROS mesh message which is then processed by Fast Global Registration (FGR) node. FGR uses this mesh patch to find a global alignment with respect to the saved mesh. A further ICP step may be used to refine the alignment between the two meshes and publishes a correction transformation on the global reference frame. After applying this correction on its tracking state, localization may continue by processing the data from main memory. Depth integration is turned off, and pure localization is achieved using the stored data from the previous localization session/processing.

The drone's standard communication protocol between the flight controller and the battery was modified to allow for offboard power. In the default operation, the flight controller reads the data from the battery board (e.g., cell voltage, current, temperature, estimated remaining capacity, overall state of the battery, number of charging cycles, and the like) and, according to this data, lowers the flight time limit. Bridging the flight controller and battery board and changing these parameters (e.g., sending fictitious data to the flight controller) achieves unlimited flight time. Communication with the battery board also includes "heartbeat" messages, which does not allow the propellers to turn. Passing this message through the bridge without data alterations makes the flight controller think that the original battery is placed on the platform.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, a pan-tilt nozzle is mounted upon a robotic arm, without a drone, and the robot's controller performs the functions described herein with regard to the nozzle's positioning using a painting trajectory to position its robotic arm to provide proper localization of the pan-tilt painting nozzle. The power line and paint/air supply lines may be run within or on the robotic arm, and the robot may be land-based.

We claim:
1. An autonomous painting system for painting a target surface of a structure, comprising:
    a drone including a drive system and a body supporting an onboard controller;
    a support arm extending outward from an exterior surface of the body of the drone;
    a spray paint nozzle mounted on the support arm;
    a paint supply fluidically connected to the spray paint nozzle with a paint supply line, wherein the controller operates the drive system to position the spray paint nozzle relative to the target surface and operates the spray paint nozzle to spray paint supplied by the paint supply via the paint supply line onto the target surface;

a tilt motor and a pan motor supported on the support arm and imparting tilt and pan motions, respectively, to the spray nozzle in response to control signals from the controller; and memory on the body of the drone accessible by the controller, wherein the memory stores a 3D model of the target surface annotated with a trajectory for the drone to follow during painting of the target surface and with a set of paint commands associated defining operations of the spray paint nozzle at locations along the trajectory.

2. The system of claim 1, wherein the drone comprises unmanned aerial vehicle (UAV) and wherein the spray paint nozzle is positioned on the support arm at a distance from the exterior surface of the body of the drone to be outside a rotation diameter of rotors of the UAV.

3. The system of claim 1, further comprising an external power source and a power line connecting a set of electrically powered components on the drone and the support arm to the external power source.

4. The system of claim 3, wherein the paint supply is external to the body of the drone and wherein the external power source and the paint supply are positioned at an elevation greater than an elevation of the target surface of the structure.

5. The system of claim 4, wherein at least one protective cage is mounted on the body to enclose at least one propeller of the drive system, whereby the power line and the paint supply line are prevented from contacting the at least one propeller.

6. The system of claim 1, wherein the control signals the pan and tilt motors are generated by the controller to position the spray nozzle based on the trajectory.

7. The system of claim 6, further comprising a set of sensors on the body of the drone sensing information on the target surface and wherein the controller processes the sensed information along with the 3D model of the target surface to localize the drone and, in response, to generate the control signals for the pan and tilt motors and the control signals for the spray nozzle.

8. An autonomous painting system for painting a target surface of a structure, comprising:
an unmanned aerial vehicle (UAV) including a drive system with one or more rotors and a body enclosing an onboard controller;
a support arm extending outward from an exterior surface of the body of the UAV;
a spray paint nozzle mounted on the support arm;
a paint supply positioned external to the body of the UAV and coupled to the spray paint nozzle via a paint supply line, wherein the controller operates the drive system to position the spray paint nozzle relative to the target surface and operates the spray paint nozzle to spray paint supplied by the paint supply via the paint supply line onto the target surface;
a tilt motor and a pan motor on the support arm operating to impart tilt and pan motions, respectively, to the spray nozzle in response to control signals from the controller; and
memory on the body of the drone accessible by the controller, wherein the memory stores a 3D model of the target surface annotated with a trajectory for the drone to follow during painting of the target surface and with a set of paint commands associated defining operations of the spray paint nozzle at locations along the trajectory.

9. The system of claim 8, wherein the control signals for the pan and tilt motors are generated by the controller to position the spray nozzle based on the trajectory.

10. The system of claim 9, further comprising a set of sensors on the body of the drone sensing information on the target surface and wherein the controller processes the sensed information along with the 3D model of the target surface to localize the drone and, in response, to generate the control signals for the pan and tilt motors and the control signals for the spray nozzle.

11. The system of claim 8, further comprising an external power source and a power line connecting set of electrically powered components on the drone and the support arm to the external power source.

12. The system of claim 11, wherein the external power source and the paint supply are positioned at an elevation greater than an elevation of the target surface of the structure.

13. An autonomous painting system for painting a target surface of a structure, comprising:
unmanned aerial vehicle (UAV) including a drive system with one or more rotors and a body enclosing an onboard controller;
a support arm extending outward from an exterior surface of the body of the UAV;
a spray paint nozzle mounted on the support arm, wherein the controller operates the drive system to position the spray paint nozzle relative to the target surface and operates the spray paint nozzle to spray paint supplied by the paint supply via the paint supply line onto the target surface;
a tilt motor and a pan motor on the support arm operating to impart tilt and pan motions, respectively, to the spray nozzle in response to control signals from the control; and
memory on the body of the drone accessible by the controller, wherein the memory stores a 3D model of the target surface annotated with a trajectory for the drone to follow during painting of the target surface and with a set of paint commands associated defining operations of the spray paint nozzle at locations along the trajectory.

14. The system of claim 13, wherein the control signals for die pan and tilt motors are generated by the controller to position the spray nozzle based on the trajectory.

15. The system of claim 14, further comprising a set of sensors on the body of the drone sensing information on the target surface and wherein the controller processes the sensed information along with the 3D model of the target surface to localize the drone and, in response, to generate the control signals for the pan and tilt motors and the control signals for the spray nozzle.

16. The system of claim 13, further comprising:
a paint supply positioned external to the body of the UAV and coupled to the spray paint nozzle via a paint supply line, and
an external power source and a power line connecting a set of electrically powered components on the drone and the support arm to the external power source.

17. The system of claim 16, wherein the external power source and the paint supply are positioned at an elevation greater than an elevation of the target surface of the structure.

* * * * *

UNITED STATES PATENT AND TRADEMARK OFFICE
CERTIFICATE OF CORRECTION

PATENT NO. : 10,577,100 B2  
APPLICATION NO. : 15/798601  
DATED : March 3, 2020  
INVENTOR(S) : Paul A. Beardsley et al.

Page 1 of 1

It is certified that error appears in the above-identified patent and that said Letters Patent is hereby corrected as shown below:

On the Title Page

Item (73), Assignee:, delete "DISNEY ENTERPRISES, INC., Burbank, CA (US)" and insert therefor --DISNEY ENTERPRISES, INC., Burbank, CA (US), and ETH Zürich (Eidgenössische Technische Hochschule Zürich), Zürich, Switzerland--.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*